Jan. 1, 1952     E. F. RIOPELLE     2,580,839
VIBRATION ABSORBER
Filed June 15, 1948
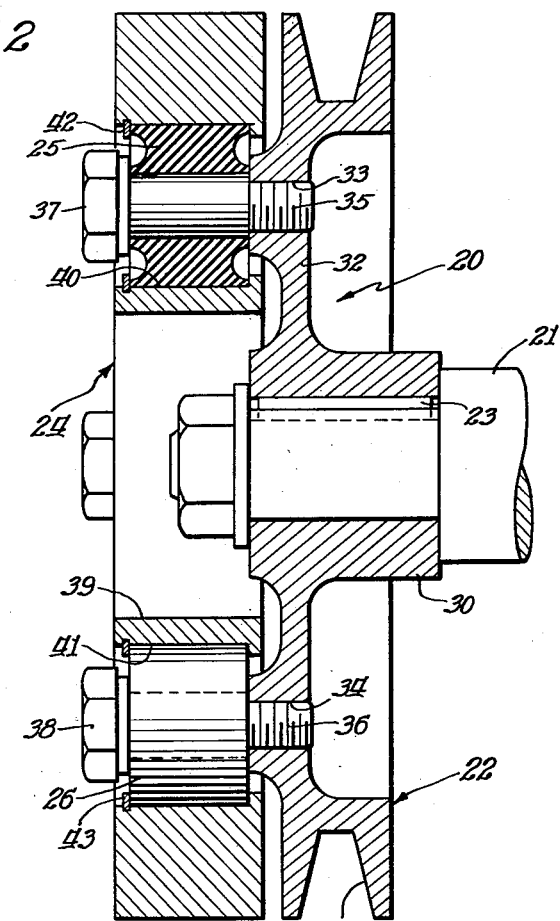
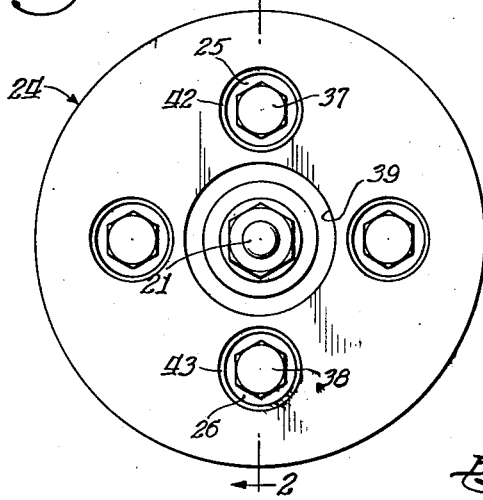
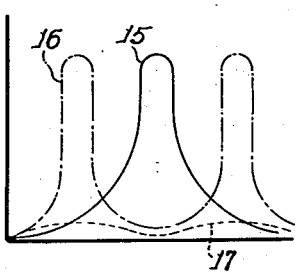
Inventor:
Earl F. Riopelle Patented Jan. 1, 1952

2,580,839

UNITED STATES PATENT OFFICE 2,580,839

VIBRATION ABSORBER

Earl F. Riopelle, Detroit, Mich., assignor to Morse Chain Company, Ithaca, N. Y., a corporation of New York Application June 15, 1948, Serial No. 33,188

2 Claims. (Cl. 74—574)

This invention relates in general to vibration absorbers, and is particularly concerned with such vibration absorbers characterized for employment in absorbing torsional and bending vibrations of shafts, such as, for example, in crankshafts of reciprocating engines.

Heretofore, in vibration absorbers of a type contemplated herein, their adaptability and mode of operation were restricted to the absorption of vibrations in only one or the other of torsional or bending vibrations developed in crankshafts of reciprocating engines as a result of gas forces in the cylinders and inertia forces of pistons and connecting rods. None of the prior art absorbers possess the versatility of the present vibration absorber which, as a single unit, universally absorbs vibrations and reduces amplitude of vibrations emanating from both aforementioned sources.

Accordingly, an object and accomplishment of the invention is to provide a vibration absorber as a single unit and characterized by its adaptability to absorb both torsional and bending vibrations emanating from revolving shafts such as, for example, of reciprocating engines.

The invention seeks, as a further object and accomplishment, to provide a vibration absorber as contemplated herein and characterized by an arrangement of parts to more advantageously and satisfactorily perform the function required of it and adapted to provide a compact unit which will successfully combine the factors of structural simplicity and durability and yet be economical to manufacture.

Another object and accomplishment of the invention is to provide a vibration absorber designed to absorb both torsional and bending vibrations of a crankshaft by the employment of an inertia member which is free to vibrate in the vertical and horizontal planes as well as about the center line of the crankshaft.

A further object of the invention is to improve the construction of vibration absorbers as contemplated herein with respect to efficiency of operation; and to this end an important feature of the invention is to provide a vibration absorber operatively disposed at the end of a rotating shaft such as, for example, the crankshaft of a reciprocating engine, said crankshaft having keyed thereto and removably carried thereby a conventional pulley for a fan belt or the like, said vibration absorber comprising an inertia member which is elastically carried by said pulley by means of a plurality of flexible and resilient members interposed between said inertia member and said pulley, said inertia member being free to vibrate in vertical and horizontal planes as well as about the center line of the crankshaft, whereby energy that would normally vibrate the crankshaft is absorbed by vibrating the inertia member.

Additional objects, features and advantages of the invention disclosed, will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing, which forms part of this specification wherein:

Fig. 1 is a front elevational view of the vibration absorber contemplated herein;

Fig. 2 is a sectional view of the vibration absorber depicted in Fig. 1 and being taken substantially on the plane 2—2 in Fig. 1; and Fig. 3 is a graphic illustration of natural operational frequencies of crankshafts of reciprocating engines and the changes therein and effect thereon when a vibration absorber as contemplated herein is employed.

The drawing is to be understood to be more or less of a schematic character for the purpose of illustrating and disclosing a typical or preferred form of the improvements contemplated herein, and in the drawing like reference characters identify the same parts in the several views.

Theoretically, natural operational frequencies of crankshafts may be graphically illustrated to define a curve 15 in Fig. 3 and the introduction into the system of a new mass tuned to this natural frequency will cause disturbing forces to effect a change in the natural frequency to define a curve 16. The problem now evolves itself into one where it is desired to reduce the amplitude of the frequencies and this is accomplished by the introduction into the system of friction which will change the frequencies to define a curve 17.

In the exemplary embodiment of the invention depicted in Figs. 1 and 2, there is illustrated one form of vibration absorber contemplated herein, designated in its entirety by the numeral 20 and operatively disposed at the end of a rotatable shaft 21 which may be, for example, the crankshaft of a reciprocating engine, said vibration absorber comprising a pulley 22 for a fan belt or the like, said pulley being keyed to, as at 23, and removably carried by said shaft 21, and aninertia member 24 which is elastically carried by said pulley by means of a plurality of flexible and resilient members as at 25 and 26 operatively interposed between said inertia member 24 and said pulley 22, whereby said inertia member is free to vibrate in vertical and horizontal planes as well as about the center line of said shaft, thereby energy that would normally vibrate said shaft is absorbed by vibrating said inertia member.

In accordance with the construction of the present invention the pulley 22 may be of the conventional type usually disposed at the end of automobile crankshafts for the purpose of providing a source of power for driving the conventional fan. The pulley may comprise a hub portion 30 adaptable to be fitted onto the shaft 21 as shown, and a groove 31 adaptable to receive the conventional fan belt (not shown), said grooved portion 31 being supported on the hub 30 by means of web portions 32.

The web portion 32 of the pulley 22 is provided with suitable threaded openings 33 and 34 adaptable respectively to receive threaded end portions 35 and 36 of bolts 37 and 38.

The inertia member 24 may be formed of cast iron or a steel disc by any approved practice to define a substantially circular shape and is provided with a central through bore 39. An important feature of the invention is the means by which the inertia member is elastically mounted on the pulley. This is accomplished by providing flexible and resilient members such as at 25 and 26 of substantially circular shape adapted to be received respectively into bores 40 and 41 in the inertia member 24. The flexible members may be formed by any suitable practice of rubber or like material having characteristics of rubber. Each of the flexible members 25 and 26 is provided with a central through bore adaptable respectively to receive portions of the bolts 37 and 38. In order to removably retain the flexible members 25 and 26 in their respective operative positions in the bores 40 and 41, there are provided snap rings 42 and 43.

Accordingly, it may be observed that the inertia member 24 is free to vibrate in vertical and horizontal planes as well as about the center line of the crankshaft, thereby energy that would normally vibrate the crankshaft and other parts thereof is absorbed by vibrating the inertia member. The vibrations absorbed by the inertia member reduce the amplitude of vibrations emanating from the shaft by virtue of torsional reactions or bending reactions developed in crankshafts of reciprocating engines as a result of gas forces in the cylinders and inertia forces of pistons and connecting rods.

In accordance with the construction of the present invention, the natural operational frequencies graphically illustrated to define the curve 15 in Fig. 3 are disturbed by the introduction into the system of the new mass or inertia member 24 which is tuned to this natural frequency by changing the size of the mass to suit the conditions required, thereby to effect the change in the natural frequency as defined by the curve 16. Friction is advantageously introduced into the system by the mechanical hysteresis or internal friction of the flexible members 25 and 26, thereby the amplitude of the frequencies will be reduced as defined by the curve 17.

Although the automotive industry has devised and does presently employ various means to damp objectionable vibrations, it is contemplated that the vibration absorber of the present invention will be employed adjunctively to such other means presently employed, and, therefore, supplement their efforts to further reduce the amplitude of objectionable vibrations.

From the foregoing disclosure, it can be observed that I have provided a vibration absorber which efficiently fulfills the objects thereof as hereinbefore set forth and provides numerous advantages which may be summarized as follows:

1. Structurally simple, efficient and durable;
2. Economical to manufacture and readily adaptable to mass production manufacturing principles; and
3. The provision of a vibration absorber adaptable to absorb both torsional and bending vibrations developed in crankshafts of reciprocating engines as a result of gas forces in the cylinders and inertia forces of pistons and connecting rods by virtue of its adaptability to vibrate in horizontal and vertical planes as well as about the center line of a shaft to which is is affixed.

While I have illustrated a preferred embodiment of my invention, many modifications may be made without departing from the spirit of the invention and I do not wish to be limited to the precise details of construction set forth, but wish to avail myself of all changes within the scope of the appended claims.

I claim:

1. A vibration absorber adapted for disposition at the end of a rotatable shaft comprising, a one piece inertia member having its principal axis substantially coincident with the axis of said rotatable shaft and having a plurality of radially arranged axially extending pockets, a rotatable member supported on and keyed to said shaft and disposed in spaced relationship to said inertia member and being formed with a corresponding plurality of integral supporting protuberances each adapted to project within the confines of an opposed pocket and terminating in a surface extending transversely to the principal axis of the rotatable member, each of said protuberances having a central threaded through bore, a corresponding plurality of stud bolts each having reduced threaded ends respectively being adapted to be received into a central through bore and each of said stud bolts having a shoulder intermediate the terminals of said bolts engaged with said transversely extending surface of said protuberances, corresponding annular elastic members each respectively contained in a pocket and interposed between each of said studs and said inertia member, one central end portion of each of said elastic members being engaged by a transversely extending surface of a related protuberance to restrict axial displacement of said end portion, an integral abutment at one end of each of said pockets adapted for engagement with peripheral end portions of a related elastic member to prevent axial displacement thereof, a removable snap ring means at the other end of each of said pockets adapted for engagement by peripheral end portions of a related elastic member to prevent displacement thereof in the other direction, and each of said studs having a tool engageable head and a second shoulder engaging a related elastic member adjacent the central end regions thereof for preventing axial displacement of said regions with respect to a related threaded stud.

2. In a vibration absorber adapted for disposition at the end of a rotatable shaft, the combination with a pulley supported on and keyed to said shaft, of a one piece inertia member, and means for supporting said inertia member on one side of said pulley comprising a plurality of stud bolts each having a reduced threaded end and a shoulder intermediate the terminals of said bolts, annular elastic members interposed between each of said studs and said inertia member, said inertia member having a plurality of radially arranged axially extending pockets for containing said elastic members, said pulley being formed with a corresponding plurality of integral supporting protuberances each adapted to project within the confines of an opposed pocket and terminating in a surface extending transversely to the principal axis of the pulley against which shoulders of said studs and central end portions of said elastic members are abutted for support and each of said protuberances having a central through bore adapted to receive portions of a threaded stud, each of said pockets having an integral abutment at one end thereof adapted for engagement with peripheral end portions of a related elastic member to prevent axial displacement thereof, and each of said pockets being provided at the other end thereof with removable snap ring means each adapted for engagement by peripheral end portions of a related elastic member to prevent axial displacement thereof in the other direction, and each of said studs having a tool engageable head and a second shoulder engaging a related elastic member adjacent the central end regions thereof for preventing axial displacement of said regions with respect to a related threaded stud.

EARL F. RIOPELLE.

REFERENCES CITED

The following references are of record in the file of this patent:

UNITED STATES PATENTS

| Number | Name | Date |
| --- | --- | --- |
| 1,701,518 | Walker | Feb. 12, 1927 |
| 1,718,208 | Anibal | June 25, 1929 |
| 1,718,656 | Manning | June 25, 1929 |
| 1,820,750 | Lord | Aug. 25, 1931 |
| 2,115,427 | Olson | Apr. 26, 1938 |
| 2,207,362 | Thorne | July 9, 1940 |
| 2,346,972 | Kishlin | Apr. 18, 1944 |
| 2,450,701 | Wahlberg et al. | Oct. 5, 1948 |